Feb. 15, 1949.  A. W. CORRIGAN  2,461,525
POULTRY FEEDER

Filed March 29, 1945  2 Sheets-Sheet 1

Inventor
ANDREW W. CORRIGAN

By Ross J. Woodward
Attorney

Feb. 15, 1949.  A. W. CORRIGAN  2,461,525
POULTRY FEEDER
Filed March 29, 1945  2 Sheets-Sheet 2
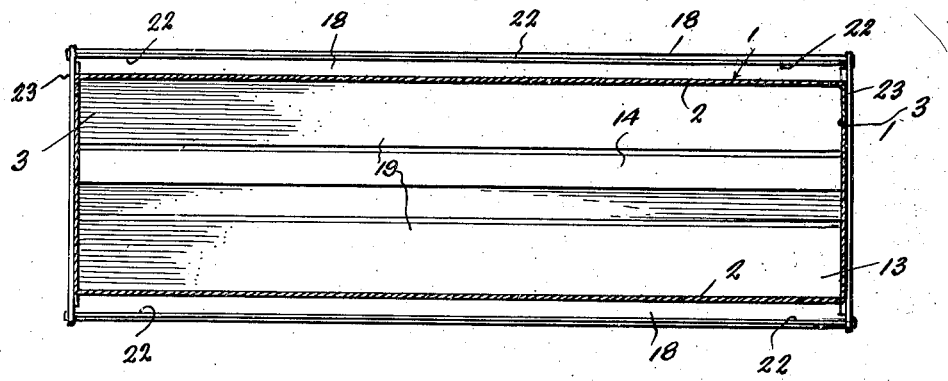
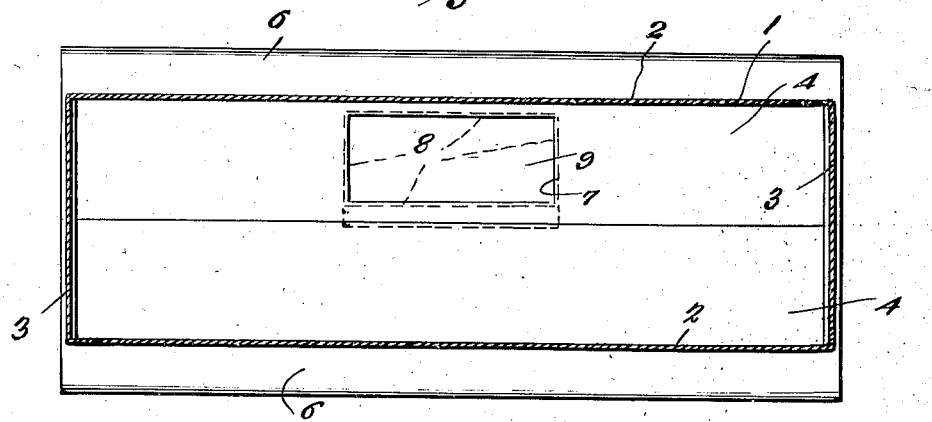
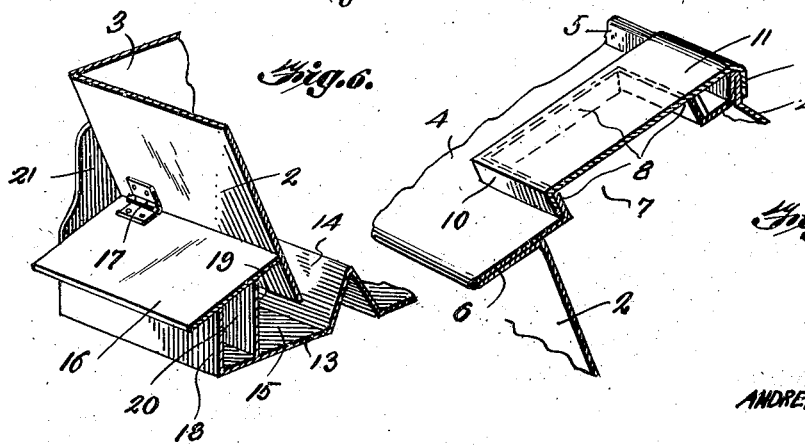
Inventor
ANDREW W. CORRIGAN
By Woodward
Attorney Patented Feb. 15, 1949

2,461,525

UNITED STATES PATENT OFFICE 2,461,525

POULTRY FEEDER

Andrew W. Corrigan, Rockford, Ill.

Application March 29, 1945, Serial No. 585,443

2 Claims. (Cl. 119—52)

This invention relates to a poultry feeder particularly intended for feeding turkeys, chickens and other fowls in a yard or run, and it is one object of the invention to provide a feeder having a hopper or casing adapted to be filled with free-running feed which flows from the hopper into troughs at opposite sides thereof so that the birds may feed from the troughs and feed in the troughs may be replenished from the hopper as it is consumed.

Another object of the invention is to provide a feeder wherein auxiliary troughs are provided along the main troughs so that feed knocked from the main troughs will be caught in the auxiliary troughs and thus prevented from being wasted.

Another object of the invention is to provide means over the troughs for wiping feed from the bills of the birds eating from the troughs, the wiping means being so located that feed wiped from their bills will drop into the troughs.

Another object of the invention is to provide an improved cover for a filling opening in the top of the hopper or casing, the top of the casing being formed with a longitudinally extending ridge strip which will prevent birds from roosting upon the hopper and also allow a cover for the filling opening to be supported upon the top of the hopper and prevented from falling to the ground while feed is being poured into the hopper.

Another object of the invention is to provide the device with plates at the ends of the troughs which serve as windshields and very effectively prevent wind from blowing feed out of the troughs.

Another object of the invention is to provide covers for the troughs so mounted that they may be swung upwardly from closed position to raised position and held in the raised position so that the birds may have free access to feed in the troughs.

Another object is to provide a feeder which is formed of sheet metal, thus providing a feeder which is strong but light in weight and water proof, so that it will not be damaged by exposure to rain, and rain will not enter the feeder and spoil the feed when the covers are closed.

In the accompany drawings:

Fig. 1 is a side view of the improved poultry feeder.

Fig. 2 is an end view thereof.

Fig. 3 is a sectional view taken transversely through the feeder on the line 3—3 of Fig. 1.

Fig. 4 is a sectional view taken longitudinally through the feeder on the line 4—4 of Fig. 1.

Fig. 5 is a sectional view on the line 5—5 of Fig. 3.

Fig. 6 is a fragmentary perspective view of one end portion of the improved feeder.

Fig. 7 is a fragmentary perspective view showing a portion of the top of the feeder and a portion of the cover which closes the filling opening in the top.

This improved poultry feeder is preferably formed of sheet metal but it will be understood that other materials may be used. The body or housing 1, which may be referred to as a storage bin or feed container, may be of any desired length and height and has side walls 2 which are mounted between end walls 3 and converge downwardly, as shown clearly in Fig. 3. The top sections 4 are formed integral with the side walls and, referring to Fig. 3, it will be seen that the sheet metal from which the top sections and the sidewalls are formed is bent to form an upstanding ridge or strip 5 between the top sections and also bent to form portions 6 of double thickness corresponding to eaves of a building and projecting outwardly from upper edges of the sidewalls. A filling opening 7 is formed through one top section midway its length and portions of this top section are bent upwardly to form flanges 8 which extend along the sides and ends of the opening so that water may not enter the hopper or housing through this opening. The filling opening is normally closed by a cover 9 having depending marginal flanges 10 for engaging the flanges 8 of the opening and this cover has its upper side portion extended to form a retainer 11 carrying a depending flange 12 for engaging the ridge or strip 5. This retainer serves to prevent the cover from being accidentally dislodged from the flanges of the filling opening and also serves as means for engaging the strip 5 and holding the cover in place upon the top at one side of the filling opening while the hopper is being filled with feed. Therefore, the cover will not become soiled by being placed upon the ground while filling the hopper.

The bottom 13 of the housing is also formed of sheet metal and is mounted between lower portions of the end walls which are widened as shown in Figs. 2 and 3. Midway its width, the sheet of metal from which the bottom is formed is bent to form an upstanding deflector 14 of inverted V-shape located midway the lower ends of the sidewalls 2 in spaced relation thereto. Therefore, feed in the hopper or housing 1 will be deflected by the deflector 14 and directed into eating troughs 15 at opposite sides of the feeder. Covers which are connected with the side walls 2 by hinges 17, are provided for closing the troughs 15 when desired, and, when these covers are swung downwardly to closed position, they rest upon the upper edges of walls 18 of the troughs and also upon the upper edges of partitions 19 which extend longitudinally in the troughs and define auxiliary troughs 20, which may be referred to as waste troughs since they are intended to catch feed which may be knocked out of the main troughs 15 by birds feeding therefrom. The triangular portions 21 of the end walls constitute shields disposed at ends of the troughs and serve to prevent wind from blowing feed from the troughs. These shields also constitute means for frictionally engaging ends of the covers 16 and holding them in raised position. When turkeys, chickens and other fowls are eating, they frequently stop to wipe feed from their bills and, in order to permit this to be done, there have been provided wires 22 which extend longitudinally of the feeder at opposite sides thereof and are carried by strips or bars 23 which are secured to the end walls 3 transversely thereof with their end portions projecting from opposite sides of the hopper. These wires are of such height that turkeys or other fowls feeding from the troughs may readily reach the wires and wipe feed from their bills. The feed wiped from the birds' bills will drop into the auxiliary troughs 20. The extensions or eaves 6 will serve to prevent rain from falling into the troughs but, if necessary, the covers 16 may be swung downwardly to closed position for covering the troughs. When the covers 16 are swung upwardly to open position, their end edges engage inner surfaces of the shields 21 and frictionally hold the covers raised. Since the deflector 14 is midway the width of the bottom and spaced from the lower edges of the side walls feed in the hopper will be directed into both of the troughs 15 and, since the hinged inner side edges of the covers 16 are spaced upwardly from the lower edges of the side walls, the fowls may only have access to the feed in the troughs and feed will be prevented from flowing too freely from the hopper and overflowing from the troughs.

What is claimed:

1. A poultry feeder comprising a housing having a bottom, side walls, end walls, and a top, said side walls converging downwardly and having their lower edges spaced upwardly from the bottom, the end walls having lower portions projecting beyond the side walls and together with portions of the bottom forming troughs communicating with the housing through the space between the side walls and the bottom, covers for said troughs hinged to the side walls in upwardly spaced relation to lower edges of the side walls and extending at a downward incline toward their lower side edges when closed, partitions dividing the troughs into inner main feeding troughs communicating with the housing through space between the side walls and the bottom and outer auxiliary troughs along outer sides of the main troughs, bars carried by the end walls above the troughs and projecting outwardly from the side walls, in upwardly spaced relation to the troughs, and wires carried by said bars in outwardly spaced relation to the side walls, the said wires constituting beak cleaners disposed over said troughs.

2. A poultry feeder comprising a housing having a bottom, a top, side walls, and end walls, the top having side portions extending at a downward incline from each other toward sides of the housing, an upstanding ridge strip between the intersecting side edges of the said top sections, one top section being formed with a filling opening having upstanding flanges along its margins, a cover for the filling opening fitting about the marginal flanges thereof when in place, said cover having an extension along its upper side edge engaging said ridge strip terminating in a depending flange to prevent accidental dislodgement of the cover and also serving as means for engaging the ridge strip and holding the cover in place upon the top section when removed, and troughs extending along sides of the housing and communicating with the housing.

ANDREW W. CORRIGAN.

REFERENCES CITED

The following references are of record in the file of this patent:

UNITED STATES PATENTS

| Number | Name | Date |
|---|---|---|
| 379,489 | Newbanks | Mar. 13, 1888 |
| 421,465 | Woodworth | Feb. 18, 1890 |
| 731,138 | Stearns | June 16, 1903 |
| 843,792 | Boyd | Feb. 12, 1907 |
| 887,818 | Kuettner | May 19, 1908 |
| 962,635 | Griner | June 28, 1910 |
| 1,176,256 | Trompen et al | Mar. 21, 1916 |
| 1,343,093 | Shoultz | June 8, 1920 |
| 1,437,462 | Belvel | Dec. 5, 1922 |
| 1,441,345 | Heacock | Jan. 9, 1923 |
| 1,528,413 | Frest | Mar. 3, 1925 |
| 1,534,375 | Foucht | Apr. 21, 1925 |
| 1,576,419 | Ellman | Mar. 9, 1926 |
| 1,610,614 | McCullough | Dec. 14, 1926 |
| 1,656,061 | Hall | Jan. 10, 1928 |
| 1,787,330 | Speicher | Dec. 30, 1930 |
| 1,831,828 | Swendsen | Nov. 17, 1931 |
| 1,907,372 | Stolp | May 2, 1933 |
| 2,166,982 | Wilson | July 25, 1939 |

FOREIGN PATENTS

| Number | Country | Date |
|---|---|---|
| 228,711 | Great Britain | Feb. 12, 1925 |